United States Patent [19]

Graves et al.

[11] Patent Number: 4,544,537
[45] Date of Patent: Oct. 1, 1985

[54] METHOD FOR PURIFYING CYCLIC DICHLOROPHOSPHAZENE TRIMER OF CATALYTIC IMPURITIES

[75] Inventors: Daniel F. Graves, Clinton; Dennis L. Snyder, Mineral City, both of Ohio

[73] Assignee: The Firestone Tire & Rubber Company, Akron, Ohio

[21] Appl. No.: 682,131

[22] Filed: Dec. 17, 1984

[51] Int. Cl.⁴ ............................................. C01B 25/10
[52] U.S. Cl. .................................................... 423/300
[58] Field of Search ......................................... 423/300

[56] References Cited

U.S. PATENT DOCUMENTS

| | | | |
|---|---|---|---|
| 3,694,171 | 9/1972 | Dreifus | 423/300 |
| 4,175,113 | 11/1970 | Fieldhouse | 423/300 |
| 4,259,305 | 3/1981 | Anderson | 423/300 |
| 4,327,063 | 4/1982 | Fieldhouse et al. | 423/300 |
| 4,382,914 | 5/1983 | Horie et al. | 423/300 |

OTHER PUBLICATIONS

Colclough, R. O. and Gee, G., *Journal of Polymer Science:* Part C, No. 16, pp. 3639–3642, (1968).

*Primary Examiner*—John Doll
*Assistant Examiner*—Wayne A. Langel
*Attorney, Agent, or Firm*—Frank J. Troy, Sr.

[57] ABSTRACT

Cyclic dichlorophosphazene trimer which is substantially pure except for catalytic impurities is purified by treating the trimer in the liquid phase with $P_2O_5$ for 10–30 minutes at a temperature of 120°–170° C. and atmospheric pressure, then subjecting the reaction mix to a single further purification step by sublimation, melt filtration, or distillation. The purified trimer will not polymerize in the absence of added catalyst at 300° C. or below.

7 Claims, No Drawings

METHOD FOR PURIFYING CYCLIC DICHLOROPHOSPHAZENE TRIMER OF CATALYTIC IMPURITIES

TECHNICAL FIELD

This invention is directed to removing catalytic impurities from cyclic dichlorophosphazene trimer to produce highly purified trimer which will not polymerize in the absence of added catalyst at 300° C. or below. The invention provides a standardized starting material which when polymerized at a predetermined temperature in the presence of a predetermined amount of selected catalyst gives consistent reproducible polymerization product. In other words, the invention allows control of polymer molecular weight (dilute solution viscosity). The product of the inventive process will sometimes be referred to herein as non-self-polymerizing trimer.

BACKGROUND OF THE INVENTION

Dichlorophosphazene trimer is ordinarily purified by separating the cyclic trimer from linear oligomer. However, the "purified" trimer contains trace amounts of catalytic impurities, sometimes called protic impurities (i.e. materials capable of acting as proton donors). These catalytic or protic impurities include, for example, water, methanol, ethanol, isopropanol, alkyl amines and other basic materials, hydrochloric acid, and hydrolyzed cyclic and linear trimer including phosphoramidate. The term "trace amounts" refers to amounts of impurities on the order of parts per million (hereinafter PPM), e.g. 10 to 1,000 PPM.

These trace amounts of catalytic impurities have a catalytic effect during polymerization. Since the amount of these in each batch of trimer differs, the product of a polymerization run is ordinarily not reproducible.

Some of the catalytic impurities are readily removed. For example, water is readily removed by drying. Others of the catalytic impurities, e.g. hydrolyzed trimer, are very difficult to remove under normal conditions.

Because of the desirability of removing catalytic impurities and because of the difficulty involved as described above, work has been carried out directed to removing all such impurities, i.e. to purification to the extent of producing non-self-polymerizing cyclic trimer, i.e. cyclic trimer which does not polymerize in the absence of added catalyst even at temperatures as high as 300° C.

Non-self-polymerizing trimer has been described in Colclough and Gee, Journal of Polymer Science: Part C, No. 16, pp: 3639-3642 (1968). Colclough et al. produce this by a sequence of operations involving recrystallization, refluxing at 130° C. over BaO in an atmosphere of dry nitrogen, passage of the trimer vapor at 130° C. over phosphorus pentoxide, followed by repeated sublimations. This is a very complicated many step procedure.

Non-self-polymerizing trimer can also be prepared by the method described in Fieldhouse et al. U.S. Pat. No. 4,327,063. In the process of this patent, trace amounts of protic impurities are removed by treating cyclic dichlorophosphazene trimer with boron trihalide under specified temperature and pressure conditions.

The invention herein offers an alternative to the process of U.S. Pat. No. 4,327,063. While relying on phosphorus pentoxide ($P_2O_5$) like Colclough et al., the invention herein is directed to a process which is much less complicated and requires less equipment and time than that of Colclough et al.

SUMMARY OF THE INVENTION

The invention herein is directed to a process for purifying cyclic dichlorophosphazene trimer which is substantially pure except for catalytic impurities (hereinafter "said trimer").

The process herein comprises the steps of (a) contacting said trimer in the liquid phase with solid $P_2O_5$ for about 10 to about 30 minutes at a temperature ranging from about 120° C. to about 170° C. at atmospheric pressure, (b) subjecting the product resulting from step (a) to a single further purification step by sublimation, melt filtration, or distillation, to recover trimer which is substantially free of catalytic impurities and which will not polymerize in the absence of added catalyst at 300° C. or below.

DETAILED DESCRIPTION

The cyclic dichlorophosphazene trimer processed herein, i.e. the cyclic dichlorophosphazene trimer which is substantially pure except for catalytic impurities, is readily available commercially. It ordinarily contain trace amounts of catalytic impurities as described above.

The step of contacting the trimer in liquid phase with $P_2O_5$ is readily carried out by melting the trimer (m.p. about 115° C.) and adding the $P_2O_5$ as a powder and forming an admixture of the two. This step preferably utilizes $P_2O_5$ in an amount ranging from about 2% to about 10% by weight of the trimer (including the catalytic impurities) and involves agitation to increase the efficiency of contact between the $P_2O_5$ and catalytic impurities e.g. by stirring with a magnetic or other stirrer or by swirling the mix by moving the container for the mix.

This step causes reduction of catalytic impurities to phosphates. In the case of the hydrolyzed trimer impurity, this results in hydrolyzed trimer reaction product of reduced volatility and substantially increased viscosity enabling separation of such reaction product and other reacted catalytic impurities from the cyclic trimer in one further separation step.

Preferably the step involving $P_2O_5$ contact is carried out at a temperature ranging from about 155° C. to about 165° C. over a time period ranging from about 15 minutes to about 25 minutes.

The step involving $P_2O_5$ contact is preferably carried out under a dry inert gas atmosphere, e.g. of argon or nitrogen, to prevent further catalytic impurities from infiltrating from the environment. This is readily accomplished by carrying out this step in a glove box, i.e. a box equipped with an inert gas atmosphere, an air lock for introducing items into the box without disturbing the protective atmosphere and gloves in the walls of the box for use in manipulating items inside the box. The contacting (reaction) is readily carried out inside the glove box in a vessel equipped with heating means, e.g. a heating mantle.

Turning now to the single purification step carried out on the product resulting from the $P_2O_5$ contact step, such purification relies on the difference in volatilities or viscosity described above.

Turning firstly to the final purification step in the case where purification is carried out by sublimation, this is readily carried out on cooled product by heating the product under vacuum and recovering substantially pure cyclic trimer by condensation of it on a cold finger.

The sublimation is preferably carried out by heating the cooled product of the $P_2O_5$ contact step at a temperature ranging from about 50° C. to about 90° C., very preferably from about 65° C. to about 75° C., for a time period ranging from about 10 hours to about 25 hours, under as high a vacuum as is normally obtained using a conventional vacuum pump, e.g. 0.05 mm Hg to 0.10 mm Hg, and using tap water, e.g. at a temperature ranging 10°–20° C., for cooling the cold finger. The product of the $P_2O_5$ contact step is readily cooled to room temperature prior to the sublimation step by allowing it to cool at ambient, for example, over a period of 20 to 40 minutes.

When the final purification step is carried out by sublimation, the $P_2O_5$ contact step is readily carried out in the sublimator bottom surrounded by a heating mantle in a glove box so that after the $P_2O_5$ contact step, the mantle can be inactivated to allow the product to cool whereupon the sublimator top equipped with a cold finger can be attached in the glove box and a vacuum can be drawn on the sublimator to allow it to be removed from the glove box without infiltration of catalytic impurities. Once the sublimator is out of the glove box, the water lines to the cold finger are hooked up and the sublimator bottom is heated, e.g. in an oil bath, and a vacuum pump is used to pump down to operating vacuum. The purified trimer condenses on the cold finger and is readily recovered by discontinuing the water flow and transferring the sublimator back into the glove box and removing the purified trimer from the cold finger by scraping it therefrom under the inert protective atmosphere of the glove box.

Turning now to the final purification step in the case where final purification is carried out by melt filtration, this step is conveniently carried out on the molten product of the $P_2O_5$ treatment step. This is readily carried out by pouring the product of the $P_2O_5$ contact step, before it has had a chance to cool and is still molten, e.g. at a temperature ranging from about 120° C. to about 170° C. through a fiber glass filter, e.g. Whatman GF/A Glass Fibre Paper, directly into a polymerization tube whereby the purified trimer is recovered in the polymerization tube and is ready for polymerization therein in contact with a predetermined amount of added polymerization catalyst to obtain predetermined polymerization results. If the product of the $P_2O_5$ contact step has solidified, it is readily melted for filtering. Where the final purification is to be carried out by melt filtration, the $P_2O_5$ contact step is readily carried out in a boiling flask in a glove box under an inert atmosphere.

Turning now to the final purification step in the case where final purification is carried out by distillation, this step is readily carried out by subjecting the product of the $P_2O_5$ contact step to distillation at, for example, about 100° C. to 120° C. under a high vacuum, e.g. 0.05–0.10 mm Hg. In this case, the $P_2O_5$ contact step is conveniently carried out in the distillation apparatus under the protective atmosphere in a glove box to minimize the need for handling.

The invention herein allows the recovery of trimer substantially free of catalytic impurities using only one post $P_2O_5$ contact purification step and utilizing commercially available starting material without the need of subjecting such starting material to purification treatment prior to the $P_2O_5$ contact step. The product when polymerized under predetermined catalyst temperature and time conditions provides predetermined polymer, i.e. of predetermined molecular weight/dilute solution viscosity.

The invention herein is illustrated in the following working example.

In this example, apparatus utilized includes a glove box equipped with an air lock, said apparatus being obtained from Vacuum Atmospheres, Inc. Other apparatus used in carrying out the run of the example includes a sublimator having a 3½ inch diameter bottom surrounded by a heating mantle and a detachable top which is equipped with a one inch diameter cold finger which has a water inlet and outlet for movement of cooling tap water therethrough and which is also equipped with means for connection to a vacuum pump for providing a vacuum in the sublimator.

EXAMPLE

Commercially obtained cyclic dichlorophosphazene trimer pure except for catalytic impurities, a container of $P_2O_5$ powder, and the sublimator which is free of catalytic impurities are introduced into the glove box through its air lock into the glove box cavity wherein they are protected from contamination by a protective argon atmosphere in the glove box.

Using the gloves in the glove box, 100 grams of the commercially obtained trimer in powder form is added into the sublimator bottom and the heating mantle is activated to provide a temperature of 160° C. to melt the trimer. Five grams of $P_2O_5$ powder (5 weight percent based on the weight of the crude trimer) is added into the molten trimer in the sublimator bottom and the sublimator bottom is moved to swirl the mix therein while maintaining the 160° C. temperature for about 20 minutes. Then the mantle is inactivated and the mix is allowed to cool to room temperature over a period of 20–30 minutes. The top of the sublimator is then attached, a vacuum is drawn on the interior to protect the contents therein from contamination and the sublimator is removed from the glove box. Then water lines are hooked up to the cold finger in the top of the sublimator, the bottom of the sublimator is immersed in an oil bath at 70° C. and a vacuum pump is used to provide a vacuum of 0.05 mm Hg. These conditions are maintained overnight. Substantially pure trimer sublimes and condenses on the cold finger. At this point the sublimator is detached from the water lines and is returned to the protective atmosphere of the glove box where the sublimator is disassembled and the purified trimer is scraped from the cold finger into a dish. Still in the glove box, purified trimer is introduced from the dish into a dried polymerization tube, and the tube is sealed. The sealed tube is placed in a circulating air oven at 270° C. for one week. No polymerization occurs.

In another case the starting material, instead of being purified, is introduced directly into a polymerization tube and the polymerization tube is placed in a circulating air oven at 250° C. for 31 hours. There is a 21% coversion of cyclic trimer to polymer (2.40 dilute solution viscosity in toluene and 0% gel).

In another case $P_2O_5$ treatment is carried out under the protective atmosphere of a glove box by introducing 100 grams of trimer to be purified into a 250 ml boiling flask and melting therein. 2.5 grams of $P_2O_5$ powder is introduced therein and the temperature raised to 170° C. and the mix is maintained at 170° C. with stirring for 20 minutes. At the end of the 20 minute period, the mix is purified under the protective atmosphere in the glove box by melt filtering. This is carried out by pouring the mix through Whatman GF/A Glass Fibre Paper and recovering the filtrate in a polymerization tube which is sealed. No polymerization occurs when the polymerization tube is maintained in a circulating air oven for one week at 270° C. The trimer starting material which is not treated by the process herein does noticeably polymerize under these polymerization conditions.

Non-self-polymerizing trimer is also obtained by subjecting the mix obtained from $P_2O_5$ treatment above to distillation at 110° C. under a vacuum of 0.05 mm Hg.

Two batches of purified trimer are prepared by the $P_2O_5$ contact and sublimation steps of the Example above. Thirty grams of each batch is admixed with triphenylphosphate-boron trichloride catalyst (0.05 grams) in a polymerization tube and the polymerization mix is maintained in a circulating air oven at 220° C. for 16 hours. In each case there is about a 40% conversion and the polymer product has an intrinsic viscosity of about 0.9.

Other variations will be evident to those skilled in the art. Therefore, the scope of the invention is intended to be defined by the claims.

What is claimed is:

1. A process for purifying cyclic dichlorophosphazene trimer which is substantially pure except for catalytic impurities, said process comprising the steps of
   (a) contacting the trimer in the liquid phase with $P_2O_5$ for about 10 to about 30 minutes at a temperature ranging from about 120° C. to about 170° C. at atmospheric pressure,
   (b) subjecting the product resulting from step (a) to a single further purification step by sublimation, melt filtration or distillation to recover trimer which is substantially free of catalytic impurities and which will not polymerize in the absence of added catalyst at 300° C. or below.
2. A process as recited in claim 1 wherein the $P_2O_5$ is used in an amount ranging from about 2% to about 10% by weight of the trimer (including the catalytic impurities).
3. A process as recited in claim 2 wherein step (a) is carried out with agitation.
4. A process as recited in claim 3 wherein step (b) is carried out by sublimation.
5. A process as recited in claim 4 wherein step (a) is carried out at a temperature ranging from about 155° C. to about 165° C.
6. A process as recited in claim 5 wherein step (a) is carried out for a time period ranging from about 15 minutes to about 25 minutes.
7. A process as recited in claim 4 wherein the sublimation is carried out by heating said mix at a temperature ranging from about 65° C. to about 75° C. under vacuum and condensing product on a cold finger cooled by tap water.

* * * * *